US012611064B2

(12) United States Patent
Wedam et al.

(10) Patent No.: US 12,611,064 B2
(45) Date of Patent: Apr. 28, 2026

(54) ELECTRIC HEATER, IN PARTICULAR FOR HOUSEHOLD APPLIANCE FOR PREPARING HOT BEVERAGES

(71) Applicant: I.R.C.A. S.P.A. INDUSTRIA RESISTENZE CORAZZATE E AFFINI, Vittorio Veneto (IT)

(72) Inventors: Stefano Wedam, Mareno di Piave (IT); Frederico Zoppas, Treviso (IT)

(73) Assignee: I.R.C.A. S.P.A. INDUSTRIA RESISTENZE CORAZZATE E AFFINI, Vittorio Veneto (IT)

( * ) Notice: Subject to any disclaimer, the term of this patent is extended or adjusted under 35 U.S.C. 154(b) by 309 days.

(21) Appl. No.: 17/625,323

(22) PCT Filed: Jul. 13, 2020

(86) PCT No.: PCT/IB2020/056541
§ 371 (c)(1),
(2) Date: Jan. 6, 2022

(87) PCT Pub. No.: WO2021/009649
PCT Pub. Date: Jan. 21, 2021

(65) Prior Publication Data
US 2022/0265085 A1      Aug. 25, 2022

(30) Foreign Application Priority Data
Jul. 15, 2019    (IT) ........................ 102019000011745

(51) Int. Cl.
*A47J 31/54*        (2006.01)
*A47J 31/46*        (2006.01)
(52) U.S. Cl.
CPC ........... *A47J 31/542* (2013.01); *A47J 31/461* (2018.08)

(58) Field of Classification Search
CPC ....... A47J 31/542; A47J 31/461; F24H 1/102; F24H 1/12; F24H 1/142; F24H 1/162;
(Continued)

(56) References Cited

U.S. PATENT DOCUMENTS

2002/0141742 A1* 10/2002 Beaulieu ............... A47J 31/545
                                                                                392/471
2010/0058606 A1*  3/2010 Nakashima .............. B01D 1/30
                                                                                392/397
(Continued)

FOREIGN PATENT DOCUMENTS

CN        103006070 A      4/2013
DE          2638380 A1      3/1978
(Continued)

OTHER PUBLICATIONS

International Search Report, dated Oct. 2, 2020, for corresponding International Patent Application No. PCT/IB2020/056541.

*Primary Examiner* — Dana Ross
*Assistant Examiner* — Joseph W Iskra
(74) *Attorney, Agent, or Firm* — Amster, Rothstein & Ebenstein LLP

(57)        ABSTRACT

An electric heater (100, 101), in particular for a device or household appliance for preparing hot beverages, comprising—a metal body (4); —at least one electric resistor (1, 6) arranged in the metal body (4); —a first pipe (2) and a second pipe (3) arranged in the metal body (4); wherein the first pipe (2) and the second pipe (3) are mutually distinct and adapted to be connected to each other so that a fluid can pass from the first pipe (2) to the second pipe (3) and/or vice versa; wherein the inner section of the second pipe (3) is greater than the inner section of the first pipe (2).

17 Claims, 5 Drawing Sheets

(58) Field of Classification Search
    CPC ...... F24H 9/139; F24H 9/2028; F24H 15/288;
                                                    F24F 1/121
    USPC ........................................................... 99/288
    See application file for complete search history.

(56) References Cited

U.S. PATENT DOCUMENTS

| | | | | |
|---|---|---|---|---|
| 2010/0218684 A1* | 9/2010 | Etter | ..................... | A47J 31/407 |
| | | | | 174/254 |
| 2013/0055902 A1* | 3/2013 | Berto | ................... | A47J 31/542 |
| | | | | 392/397 |
| 2014/0023352 A1* | 1/2014 | Jurczyszak | ........... | F24H 15/395 |
| | | | | 392/465 |
| 2015/0108109 A1* | 4/2015 | Menashes | ......... | A47J 27/21016 |
| | | | | 392/398 |
| 2016/0235246 A1* | 8/2016 | Beekman | .............. | A47J 31/542 |
| 2020/0022528 A1* | 1/2020 | Park | ...................... | A47J 31/461 |

FOREIGN PATENT DOCUMENTS

| | | | | | |
|---|---|---|---|---|---|
| DE | 102006060750 A1 | | 6/2008 | | |
| DE | 102011007542 A1 | * | 10/2012 | ........... | A47J 31/542 |
| EP | 0479389 A1 | | 4/1992 | | |
| FR | 2845261 A1 | | 4/2004 | | |
| KR | 20120042393 A | * | 5/2012 | | |

* cited by examiner

101

311

3

31          61

221          6

22

2          3

41

1

11

3

2

2          3

62

12          32          321

2          21          211          4

2

9

ELECTRIC HEATER, IN PARTICULAR FOR HOUSEHOLD APPLIANCE FOR PREPARING HOT BEVERAGES

CROSS REFERENCE TO RELATED APPLICATIONS

This application is a national phase of PCT application No. PCT/IB2020/056541, filed Jul. 13, 2020, which claims priority to IT patent application No. 102019000011745, filed Jul. 15, 2019, all of which are incorporated herein by reference thereto.

FIELD OF THE INVENTION

The present invention relates, in particular, to an electric heater for a device or household appliance for preparing hot beverages using water in the liquid state and which also has the function of generating steam, or for a device or household appliance for generating steam only by heating water in the liquid state, in particular, but not exclusively for preparing hot beverages.

BACKGROUND ART

Household appliances for preparing hot beverages, such as coffee or cappuccino, are very popular. Many household appliances of this type, in addition to being able to dispense water in a liquid state, can also dispense steam. For this purpose, one or more electric heaters are used.

One of the most critical and problematic aspects of electric heaters concerns the accumulation of limescale, particularly inside the pipe in which the steam is generated. Indeed, a lot of limescale is deposited in the pipe where steam is produced. Another critical aspect relates to the management of the hot water temperature, which must be properly controlled to avoid undesired operation. Other important aspects of the design of an electric heater are the overall dimensions, which should be as small as possible, energy efficiency, hot water and steam production speed and construction costs. Being able to combine all these aspects is not trivial.

A first known construction provides the use of a single electric heater equipped with a single pipe which is used both to produce hot water, in the liquid state, and to produce steam. If the section of the pipe is small, particularly during steam generation, a lot of limescale is deposited and therefore frequent descaling operations are necessary.

Another solution provides the use of two distinct electric heaters, each equipped with a single pipe. However, this solution implies high production costs and excessive dimensions. It also implies the use of more wiring, sensors, and piping.

The need is thus felt to provide an electric heater which allows to overcome the prior art.

SUMMARY OF THE INVENTION

It is an object of the present invention to provide an electric heater for a device or household appliance for preparing hot beverages, using water in a liquid state and/or steam, which requires a reduced descaling frequency.

In particular, it is an object of the invention to provide an electric heater for a device or household appliance for preparing hot beverages using water in the liquid state and which also has the function of generating steam, or for a device or household appliance for generating steam only by heating water in the liquid state.

It is another object of the present invention to provide e an electric heater which requires a reduced frequency of maintenance for descaling, but which also allows easy management of hot water temperatures.

It is a further object of the present invention to make an electric heater which, in addition to the aforesaid features, occupies little space and can be manufactured cost-effectively, and which is preferably also energy-efficient and capable of rapidly producing hot water in a liquid state and/or vapor state.

It is a further object of the invention to make an electric heater which can be easily and cost-effectively integrated into the aforesaid household appliance or device.

The present invention achieves at least one of such objects, and other objects which will be apparent in view of the present description, by means of an electric heater, in particular for a device or household appliance for preparing hot beverages, in particular by means of water in liquid and/or vapor state, comprising a metal body; at least one electric resistor arranged in the metal body; a first pipe and a second pipe arranged in the metal body; wherein the first pipe and the second pipe are mutually distinct and are adapted to be connected to each other so that a fluid can pass from the first pipe to the second pipe and/or vice versa; wherein the inner section of the second pipe is greater, in particular from 3 to 22 times greater, than the inner section of the first pipe.

Advantageously, the heater, in particular by virtue of the aforesaid dimensional ratio, allows to reduce the accumulation of limescale and improve the heating of the fluid, particularly for generating steam.

The invention further relates to a device or household appliance, in particular for preparing hot beverages.

Advantageously, the frequency of descaling maintenance operations can be drastically reduced and the service life of the electric heater can be significantly extended because the inner section of one of the pipes, for example, but not exclusively, the pipe from which steam can exit, is greater than the other pipe, for example, but not exclusively, the pipe which can be dedicated to the production of hot water. In particular, the pipe having a greater section may accept or contain more limescale. Advantageously, moreover, the pipe having a greater section allows faster heating of the fluid inside the pipe.

The aforesaid advantages are achieved, in particular, by virtue of the design selection, wherein the inner section of the second pipe is from 3 to 22 times greater than the inner section of the first pipe.

Preferably, the inner section of the second pipe is from 4 to 12 times greater than the inner section of the first pipe.

The aforesaid advantageous effects are even better when the second pipe is straight and/or when a turbulator is placed within the second pipe, in particular when the second pipe is straight and a turbulator is placed within the second pipe.

Preferably, the length of one of the pipes, named "first pipe" for descriptive purposes, is greater, preferably at least two times greater, than the length of the other pipe, named "second pipe" for descriptive purposes. Preferably, the length of the first pipe is from 2 to 10 times, or from 2 to 8 times longer than the length of the second pipe.

Note that the adjectives "first" and "second" are used to provide greater descriptive clarity and in no way limit the possible sequence of fluid crossing in the pipes.

Advantageously, the water temperature can be easily controlled and can remain stable. For this purpose, the ratio between the length and the inner diameter of the first pipe is preferably from 130 to 460, preferably from 180 to 420; and/or preferably the ratio between the power, in particular the maximum power, of the at least one electric resistor and the mass of the metal body is from 3 to 12 Watt/gram, in particular so that the metal body has adequate thermal inertia.

Advantageously, also, the electric heater occupies little space and is cost-effective to manufacture, e.g. by die-casting. For example, the metal body can be made by injecting metal material around the pipes and the at least one electric resistor.

Preferably, in general, the two pipes and the at least one electric resistor are incorporated or included in the metal body.

Preferably, for better heat exchange, the first pipe surrounds the electric resistor, e.g. the only electric resistor or one of two electric resistors.

The two pipes can be advantageously connected, particularly in series, e.g. by means of one or more valves and/or one or more connecting pipes.

In some advantageous examples, it is possible to produce steam directly or to produce steam after the hot water has been dispensed to prepare the hot beverage by infusion. In the latter case, the heat already produced can be advantageously exploited, so the steam is generated more quickly, with better energy efficiency. In other words, for generating steam there is a recovery of the residual heat previously generated, e.g. for dispensing the hot beverage by infusion.

Advantageously, should the second pipe be blocked, for example, the first pipe can still be used to prepare hot beverages, e.g. coffee.

Preferably, the electric heater comprises a number of pipes equal to two, i.e. only the first pipe and the second pipe and/or preferably the electric heater comprises a number of electric resistors equal to one or two, i.e. it comprises only one electric resistor or only two electric resistors.

Further features and advantages of the present invention will become more apparent in light of the detailed description of preferred, but not exclusive embodiments.

The dependent claims describe particular embodiments of the invention.

BRIEF DESCRIPTION OF THE DRAWINGS

In the description of the invention, reference is made to the accompanying drawings, which are provided by way of non-limiting example, in which.

The same elements or functionally equivalent elements have the same reference numerals.

DESCRIPTION OF EXEMPLARY EMBODIMENTS OF THE INVENTION

Figures 1, 2:
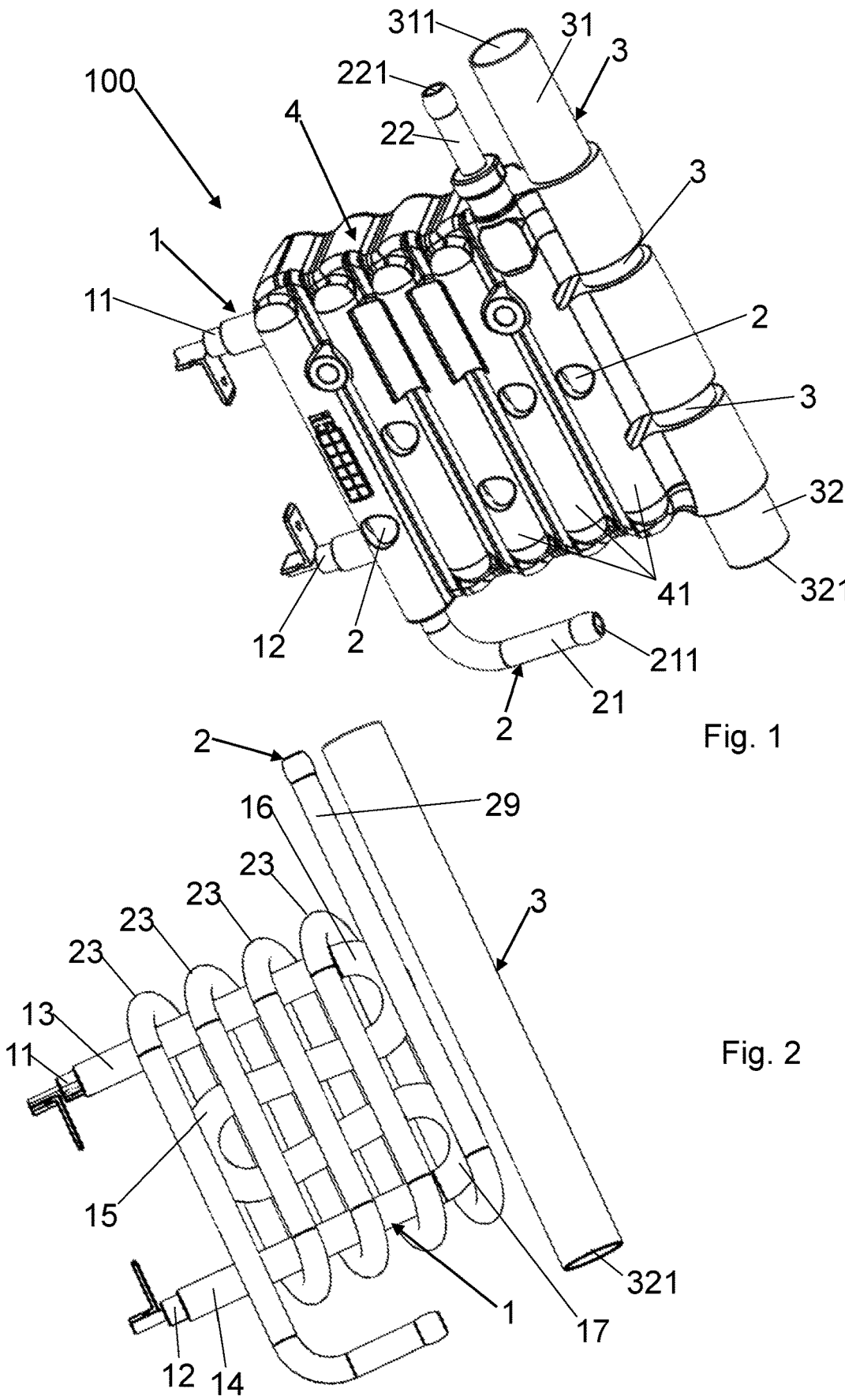
FIG. 1 shows a perspective view of an example of electric heater according to the invention.
FIG. 2 shows a perspective view of some components of the electric heater in FIG. 1.

An electric heater 100, 101 is described with reference to the figures.

The electric heater 100, 101 is particularly adapted to be installed in a device, e.g. a household appliance (not shown), for the preparation of hot beverages using liquid water and/or steam.

For example, the device or household appliance can only dispense water in a liquid state, or only water in the vapor state, or the device or household appliance may have a configuration in which it can dispense water in the liquid state and another configuration in which it can dispense water in the vapor state.

The device or household appliance can be designed, for example, for preparing hot beverages, e.g. coffee, by infusion and/or for preparing cappuccino, in particular by firstly preparing hot water with which to extract the coffee and then generating steam for preparing milk foam.

However, the heater 100, 101 can be installed in other types of devices or household appliances, also for generating only steam.

The electric heater 100, 101 comprises a metal body 4; at least one electric resistor 1, 6 arranged in the metal body 4; and two pipes 2, 3, or tubes, arranged in the metal body 4. The two pipes 2, 3 are mutually distinct. In particular, the two pipes 2, 3 are external, in particular completely external, to each other. Preferably, the two pipes 2, 3 are not mutually coaxial.

Preferably, the pipes 2, 3 are made of metal, preferably steel, in particular stainless steel.

Advantageously, the inner section, or inner section area, of the pipe 3 is greater than the inner section of the pipe 2.

This feature is particularly advantageous, e.g. when pipe 3 is used for dispensing steam. The greater section of the pipe 3 allows a greater amount of limescale to be accepted and, therefore, requires less frequent descaling operations. The larger section of the pipe 3 is also advantageous because the heat exchange surface area is increased, both between the metal body 4 and the pipe 3, and between the pipe 3 and the fluid inside it. Therefore, for example, the pipe 3 can be used as a booster to achieve faster heating of the fluid.

Preferably, the inner section of the pipe 3 is from 3 to 22 times, preferably from 4 to 12 times, greater than the inner section of the pipe 2.

The inner section of pipe 2, 3 means, in particular, a section orthogonal to the axis about which the wall which delimits pipe 2, 3, i.e. the wall of the tube, extends.

Preferably, the pipe 2 and/or the pipe 3 have a circular or a substantially circular inner cross-section and preferably also outer cross-section.

Preferably, the inner diameter of the pipe 2 is from 3 to 6 mm or from 3 to 5.25 mm and/or the inner diameter of the pipe 3 is from 7 to 14 mm. By way of non-limiting example, the wall thickness of the pipe 2 and/or of the pipe 3 is from 0.2 to 1 mm, e.g. equal to about 0.5 mm.

Preferably, the ratio between the length and inner diameter of the pipe 2 is from 130 to 460, preferably from 180 to 420.

This feature, in particular, makes the pipe 2 particularly adapted to dispensing hot water, in particular in a liquid state, having a controllable and stable temperature when it exits from the pipe 2.

Preferably, the ratio between the length and inner diameter of the pipe 3 is from 5 to 18, preferably from 7 to 11.

Preferably, the length of the pipe 2 is greater than the length of the pipe 3. Preferably, the length of the pipe 2 is at least two times the length of the pipe 3. For example, the length of pipe 2 is from 2 to 10 times, or from 2 to 8 times longer than the length of the pipe 3.

Preferably, the length of the pipe 2 is from 500 to 1200 mm, e.g. from 600 to 900 mm.

Preferably, the length of the pipe 3 is from 70 to 140 mm, e.g. from 90 to 110 mm. The length of the pipe 2, 3 means the actual length, i.e. the path from the inlet of the pipe 2, 3 to the outlet of the pipe 2, 3 along the axis, preferably longitudinal, about which the wall of the pipe 2, 3 extends. According to the shape of the pipe 2, 3, said axis may be, for example, either rectilinear or curved or may comprise rectilinear and curved stretches.

Figures 3, 4, 4A:
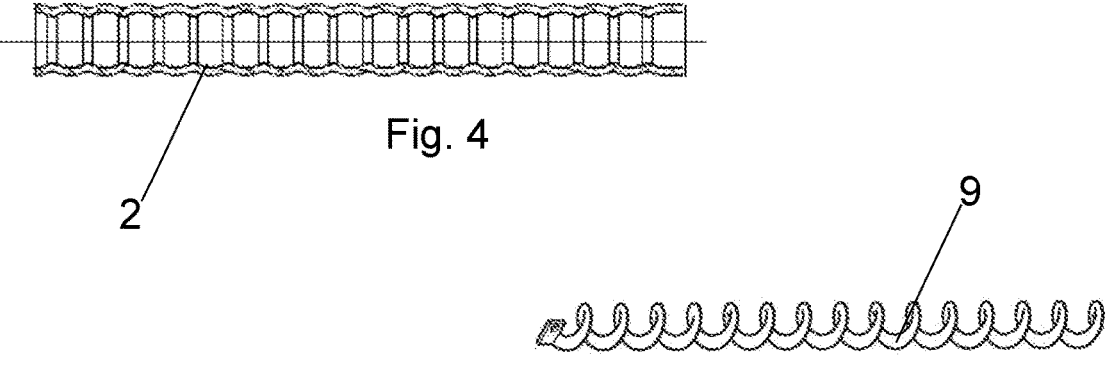
FIG. 3 shows a perspective view of another example of electric heater according to the invention.
FIG. 4 diagrammatically shows a section of a portion of a pipe of an electric heater according to the invention, according to a possible embodiment.
FIG. 4A shows an optional component of the electric heater of the invention.

With particular reference to FIG. 4, the pipe 2 and/or the pipe 3 are preferably corrugated, at least internally, preferably both internally and externally.

In particular, the pipe 2 and/or the pipe 3 preferably comprise at least one corrugated stretch, more particularly at least one corrugated stretch with inner surface irregularities or protrusions. The pipe 2 and/or the pipe 3 may be, for example, corrugated along all or part of their length. By way of example, only one corrugated stretch may be provided between two smooth stretches, or a plurality of corrugated stretches may be provided, alternating with a plurality of smooth stretches.

Preferably, but not exclusively, only the pipe 2 is corrugated and the pipe 3 can optionally be corrugated. The corrugation allows to improve the heating of the fluid and therefore to obtain a pipe 2 and/or 3 of small size obtaining the desired heating of the fluid.

FIG. 4 shows a non-limiting example of a section of a portion of the pipe 2, or the pipe 3, when it is corrugated.

For example, the inner surface of the pipe 2 is undulated, and, in particular, has inner annular protrusions.

It is to be clear that the description and illustration made with reference to the corrugated pipe 2, 3 is only a non-limiting example of how a corrugated pipe 2, 3 can be made.

The at least one electric resistor 1, 6 is a heating element capable of generating heat when it is crossed by an electric current, i.e. by Joule effect.

The at least one electric resistor 1, 6 is preferably an sheathed resistor. In particular, the at least one electric resistor 1, 6 comprises at least one resistive element arranged inside a metal casing or armor, e.g. made of iron or steel or aluminum.

Preferably, the armor of the electric resistor 1 is made of iron or steel, and the armor of the electric resistor 6, when such resistor is provided, is made of iron or steel or aluminum.

Preferably, the ratio between the power, in particular the maximum power, of the at least one electric resistor 1, 6 and the mass of metal body 4 is from 3 to 12 Watt/gram, e.g. from 3 to 9 Watt/gram or from 5 to 12 Watt/gram, in particular, but not exclusively, when the metal body 4 is made of aluminum or aluminum alloy.

In this way, in particular, the metal body 4 provides adequate thermal inertia to allow optimal management of the water temperature.

Preferably, when only one electric resistor 1, 6, e.g. the electric resistor 1, is provided, the ratio between the power, in particular the maximum power, of the electric resistor 1 and the mass of the metal body 4 is from 3 to 9 Watt/gram. Preferably, when two electric resistors 1, 6 are provided, the ratio between the power, in particular the maximum power, of the two electric resistors 1, 6 (i.e. the sum of the two powers) and the mass of the metal body 4 is from 5 to 12 Watt/gram.

The electric heater 100, 101 is preferably made by die-casting. In particular, the metal body 4 can be made by injecting metal material around the pipes 2, 3 and the at least one electric resistor 1, 6.

In other words, the metal body 4 is preferably die-cast, i.e. made by die-casting. The metal body 4 is preferably a block, in particular a solid block.

The metal body 4 allows the heat produced by the at least one electric resistor 1, 6 to be transmitted to the pipe 2 and the pipe 3, in particular by conduction.

The metal body 4 is preferably made of aluminum or aluminum alloy.

The two pipes 2, 3 and the at least one electric resistor 1, 6 are preferably incorporated or included or immersed (e.g. at least partially incorporated or included) in the metal body 4. In particular, the outer surface of the two pipes 2, 3 is in contact, in particular directly in contact, with the metal body 4; and the outer surface of the at least one electric resistor 1, 6 (in particular the outer surface of the metal casing) is in contact, in particular directly in contact, with the metal body 4. In other words, the two pipes 2, 3 and the at least one electric resistor 1, 6 are preferably within the thickness of the metal body 4. Preferably, the metal body 4 has a plurality of openings or slots. Such openings are preferably a consequence of the manufacturing process by die-casting of the heater 100, 101. For example, the two pipes 2, 3 can be arranged on suitable supports (not shown) with portions or protrusions which are arranged inside the die into which the metal material is injected to obtain the metal body 4. The supports of the at least one electric resistor 1, 6 are preferably, but not exclusively, outside the die, preferably excluding said inner portions. Each portion or protrusion of said supports corresponds to a respective opening or slot. Each opening or slot preferably leaves a respective portion of pipe 2 and/or pipe 3 uncovered, as shown in FIGS. 1 and 3. In other embodiments (not shown), as a function of the reciprocal arrangement of the at least one electric resistor 1, 6 and the two pipes 2, 3, any openings or slots in the metal body 4 may leave uncovered one or more portions of the at least one electric resistor 1, 6, of the pipe 2 and of the pipe 3 in substantially any combination.

Preferably, the outer surface of the metal body 4 is provided with a plurality, in particular a series, of ribs 41 at the pipe 2. A groove is provided between each pair of ribs 41.

Preferably, two end portions 11, 12 of the electric resistor 1 protrude from the metal body 4, preferably on the same side of the metal body 4. The ends of the electric resistor 1 are adapted to be connected to a source of electrical energy.

Preferably, at least one end portion 21, 22 of the pipe 2 and/or at least one end portion 31, 33 of the pipe 3 protrudes from the metal body 4.

In particular, preferably, two end portions 21, 22 of the pipe 2 and/or two end portions 31, 33 of the pipe 3 protrude from the metal body 4.

Preferably, the two end portions 21, 22 protrude from opposite sides of the metal body 4. Preferably, the two end portions 31, 32 protrude from opposite sides of the metal body 4.

Preferably, the end portion 21 and the end portion 32 protrude from the same side of the metal body 4 and/or the end portion 22 and the end portion 31 protrude from the same side of the metal body 4.

The end portion 21 comprises an opening 211, which for example is the inlet of the pipe 2 for a fluid, in particular water, e.g. water in a liquid state. The end portion 22 comprises an opening 221, which for example is the outlet for the fluid. The opening 211 and the opening 221 are preferably the only openings of the pipe 2. In other words, the wall of the pipe 2 is not provided with holes.

The end portion 31 comprises an opening 311, which for example is the inlet of the pipe 3 for a fluid, e.g., for the fluid which exits from the pipe 2.

The end portion 32 comprises an opening 321, e.g. an outlet for the fluid, e.g. for water in the vapor state, in particular superheated steam. The opening 311 and the opening 321 are preferably the only openings of the pipe 3. In other words, the wall of the pipe 3 is not provided with holes.

FIG. 2 shows the resistor 1 and the two pipes 2, 3 and their arrangement. In particular, FIG. 2 shows the heater 100 in FIG. 1 from which the metal body 4 was removed for the sake of illustration. The heater 100 in FIG. 1 preferably comprises only one electric resistor 1. Instead, the heater 101 in FIG. 3 comprises two electric resistors 1, 6, preferably only two electric resistors 1, 6.

For both the electric heater 100 and the electric heater 101, the pipe 2 preferably comprises a serpentine-shaped, e.g. helical, portion. Said serpentine-shaped portion is inside the metal body 4.

In particular, the pipe 2 preferably comprises one or more coils 23.

Preferably, each coil 23 comprises two curved stretches joined by two rectilinear stretches, the rectilinear stretches being preferably parallel to each other.

Preferably, the pipe 2 comprises a rectilinear stretch 29 parallel and preferably flanked or facing the pipe 3.

Preferably, the resistor 1 comprises a portion, which is arranged within the coils 23 of pipe 2, i.e. within the serpentine-shaped portion. In other words, a portion of the pipe 2 surrounds the resistor 1.

Preferably, the resistor 1 is transversal to the pipe 2.

By way of non-limiting example, the resistor 1 comprises two stretches 13, 14, which are preferably rectilinear. The stretch 13 comprises the end portion 11 and the stretch 14 comprises the end portion 12. Between the stretches 13, 14 there is a U-shaped stretch 15, connected with the two stretches 13, 14 by a respective curved stretch 16, 17. Preferably, the curved portion of the stretch 15 is proximal to the end portions 11, 12, and the curved stretches 16, 17 are distal from the end portions 11, 12. The curved stretches 16, 17, in particular their convex portion, preferably face towards the pipe 3, preferably face the pipe 3 (with reference to FIG. 2).

Preferably, the pipe 3 comprises a rectilinear, i.e. straight, portion or the pipe 3 is rectilinear, i.e. straight, in particular completely rectilinear or straight, as shown in the figures.

Preferably, when the pipe 2 comprises the coils 23, the pipe 3 extends transversely, e.g. orthogonally, to the axis about which the coils 23 of the pipe 2 extend.

As anticipated, the heater 101 in FIG. 3 comprises a further electric resistor 6, in particular, distinct from the electric resistor 1. The arrangement of the resistor 1, of the pipe 2 and of the pipe 3 is preferably substantially the same as that described previously and illustrated in FIG. 2.

Preferably, the resistor 6 is parallel to the pipe 3. In particular, preferably, the resistor 6 is rectilinear or comprises at least one rectilinear portion.

Also the resistor 6 preferably comprises two end portions 61, 62, which protrude from the metal body 4.

Preferably, the pipe 3 is arranged between the resistor 6 and the pipe 2. In particular, preferably the pipe 3 is arranged between the resistor 6, on one side, and the pipe 2 and the resistor 1, on the opposite side.

Preferably, in all embodiments, a turbulator 9 is placed inside the pipe 3. By way of non-limiting example, an example of turbulator 9, in particular a helical turbulator, is shown in FIG. 4A.

However, a turbulator may also be placed in the pipe 2.

Advantageously, in all embodiments, the pipe 2 and the pipe 3 are adapted to be connected to each other so that a fluid can pass from the pipe 2 to the pipe 3 and/or vice versa.

For example, the pipe 2 and the pipe 3 may be connected, in particular connected in series, e.g. by means of one or more valves and/or one or more connecting pipes. By way of non-limiting example, FIGS. 5 and 6 show a first example of an electric heater according to the invention, wherein the pipe 2 and the pipe 3 are connected to each other.

Figure 5:
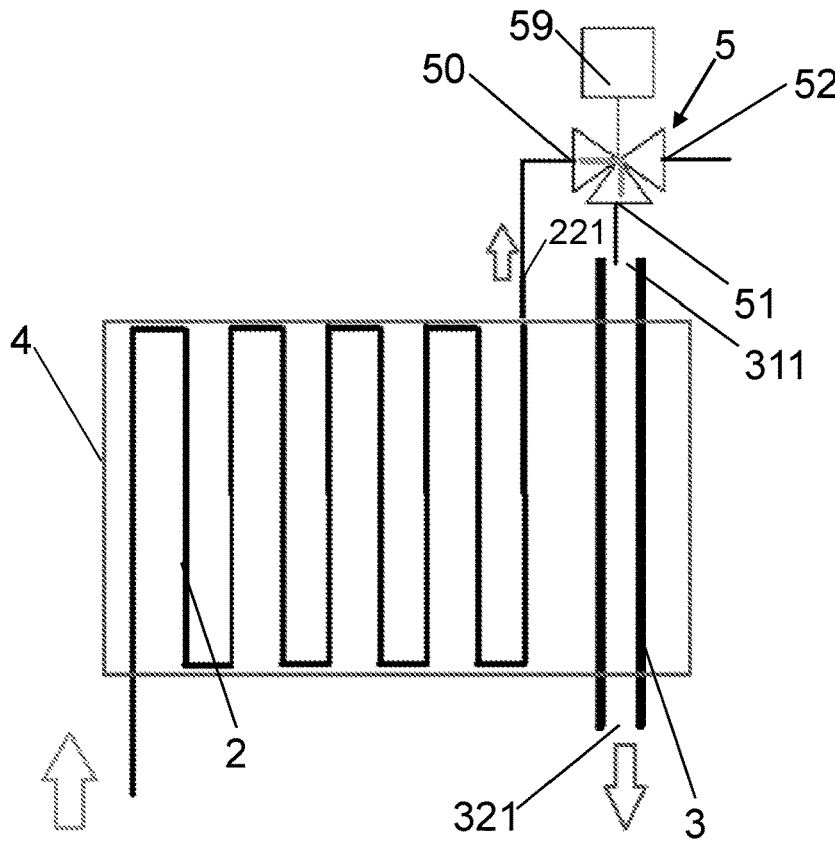
FIG. 5 diagrammatically shows a first example of an electric heater according to the invention in a first operating configuration.
Figure 6:
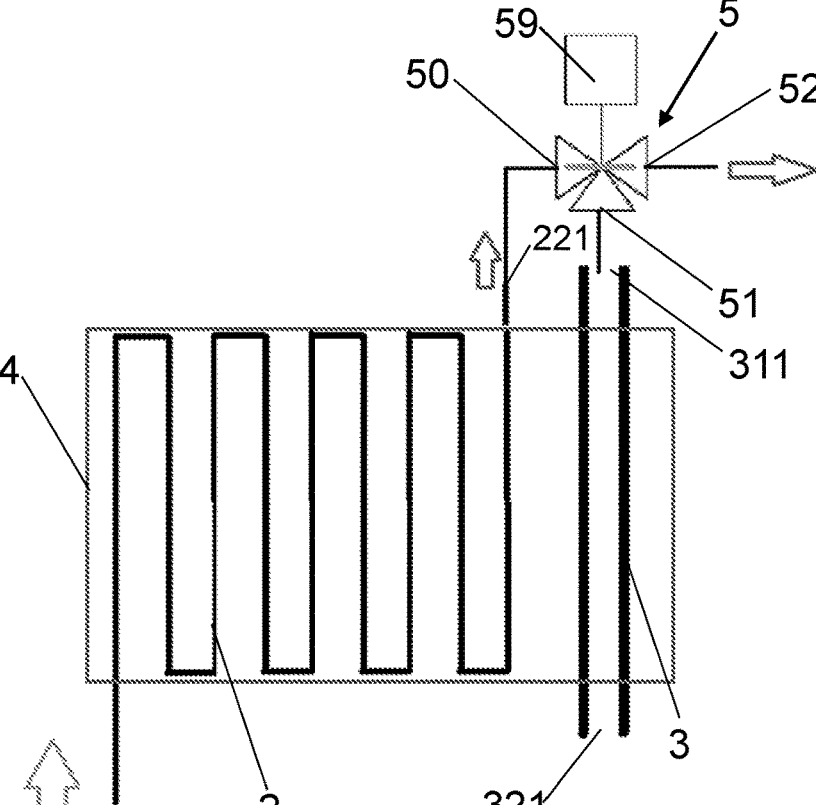
FIG. 6 diagrammatically shows the electric heater in FIG. 5 in a second operating configuration.

In particular, FIG. 5 and FIG. 6 each illustrate a respective operating configuration. The pipe 2 and the pipe 3 are connected to each other by means of a valve 5, in particular a three-way valve, preferably arranged along a connecting pipe connecting the pipe 2 and the pipe 3. The pipes 2, 3 may also be connected to each other in other ways, e.g. by two valves, in particular two two-way valves, or only with one or more connecting pipes, without valves.

The valve 5 has an inlet 50, a first outlet 51 and a second outlet 52, i.e. it has three openings 50, 51, 52, one of which is used as inlet and two are used as outlet.

The inlet 50 of the valve 5 is connected to the opening 221 (which acts as outlet) of the pipe 2 and the first outlet 51 of the valve 5 is connected to the opening 311 (which acts as inlet) of the pipe 3.

The valve 5 can take on a first configuration (FIG. 5) in which the fluid exiting from pipe 2 can flow into pipe 3 through the valve 5, in particular through the first outlet 51 of the valve 5. The valve 5 can also take on a second configuration (FIG. 6) in which a fluid exiting from the pipe 2 can exit from the second outlet 52 of the valve 5. When it flows out of the second outlet 52, the fluid can flow into another pipe, or it can in any case reach an infusion chamber or coffee preparation chamber of the device or household appliance.

The fluid flowing out of the second outlet 52 of the valve 5 is predominantly or substantially water in the liquid state.

The fluid exiting from the pipe 3 is predominantly or substantially steam, in particular superheated steam.

When the valve 5 is in the first configuration, the inlet 50 and the first outlet 51 are open, while the second outlet 52 is closed.

When the valve 5 is in the second configuration, the inlet 50 and the second outlet 52 are open, while the first outlet 51 is closed.

The valve 5 is preferably placed outside the metal body 4.

Preferably, the valve 5 is adapted to be electrically operated. For example, the valve 5 is a solenoid valve. For example, the valve 5 can be equipped with an electronic control 59. Alternatively, the valve 5 can be operated manually.

The valve 5 can pass from the first configuration to the second configuration and vice versa.

Therefore, advantageously, the electric heater can be used for dispensing steam by putting the pipe 2 and the pipe 3 into communication; and for preparing the hot beverage, in particular by infusion, by connecting the pipe 2 to, for example, an infusion chamber of the household appliance.

Advantageously, the electric heater 100, 101 allows to reduce the time required for preparing a cappuccino because after dispensing coffee, in particular by raising the set-point slightly, it is possible to produce the steam for preparing a cappuccino quickly, using the residual heat generated for preparing the coffee.

Figure 7:
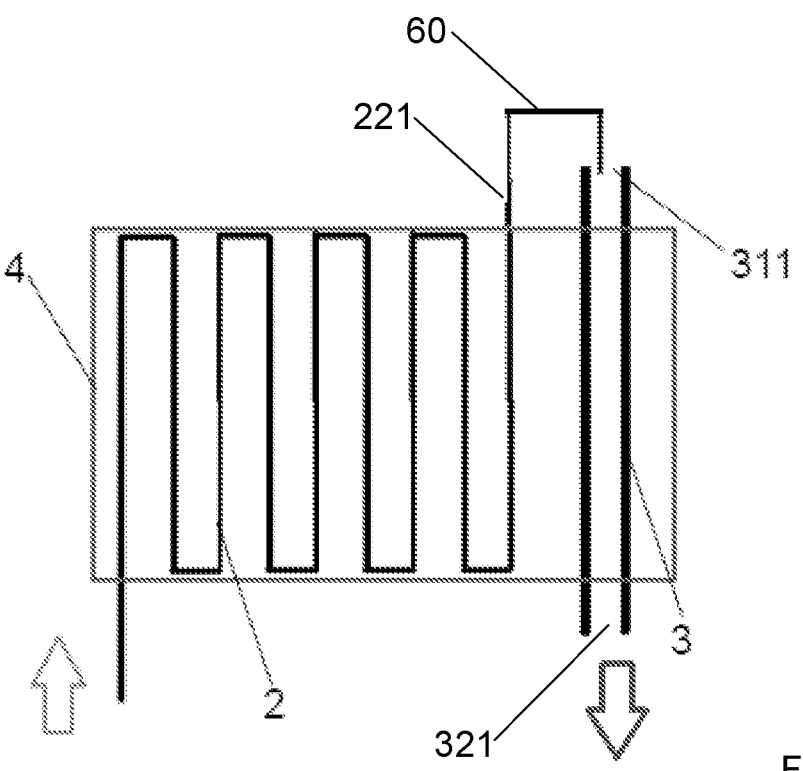
FIG. 7 diagrammatically shows another example of an electric heater according to the invention.

FIG. 7 shows another non-limiting example of an electric heater according to the invention, in which the pipe 2 and the pipe 3 are connected to each other.

In particular, the pipe 2 and the pipe 3 are connected to each other, for example, only by means of a connecting pipe 60, without valves. For example, the opening 221 (acting as outlet) of the pipe 2 is connected, by means of the connecting pipe 60, to the opening 311 (acting as inlet) of the pipe 3.

This example is particularly advantageous for devices or household appliances for dispensing only steam.

Indeed, since the pipe 3 has a larger section than the pipe 2, the pipe 3 can be used as a booster to obtain faster heating of the fluid to obtain steam.

Figure 8:
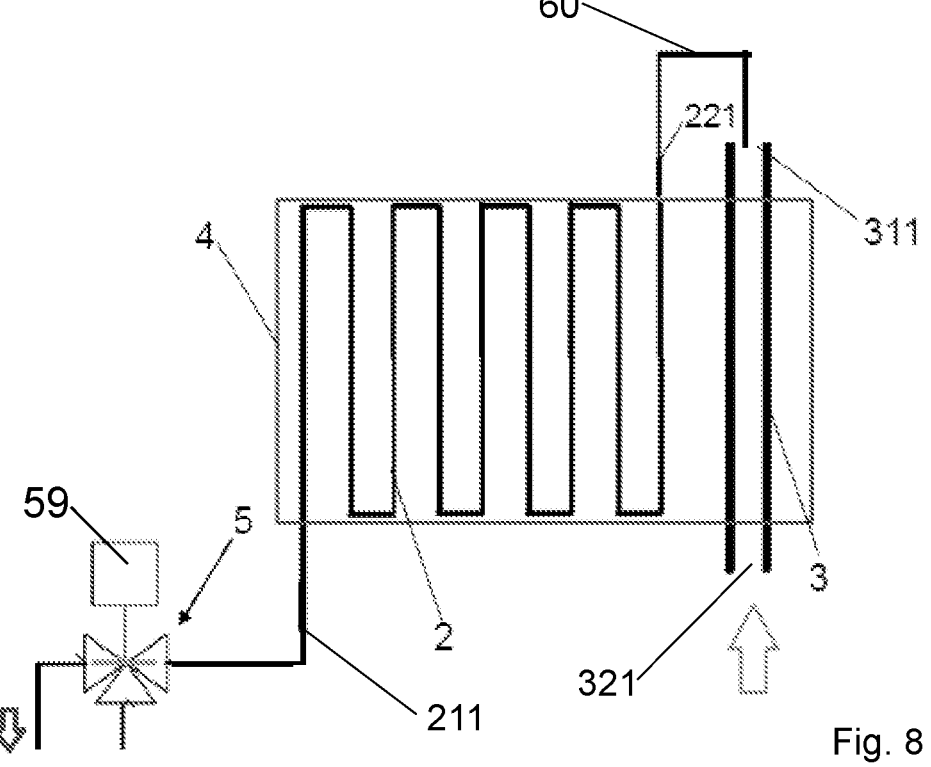
FIG. 8 diagrammatically shows another example of an electric heater according to the invention in an operating configuration.

FIG. 8 shows another non-limiting example of an electric heater according to the invention, in which the pipe 2 and the pipe 3 are connected to each other.

In particular, the pipe 2 and the pipe 3 are connected to each other, e.g. by means of a least one connecting pipe 60, e.g. only by at least one connecting pipe 60 without valves. For example, the opening 311 (acting as outlet) of the pipe 3 is connected, by means of connecting pipe 60, to the opening 221 (acting as inlet) of the pipe 2.

Preferably, moreover, the opening 211 (which acts as outlet) of pipe 2 is connected, for example, to the inlet of a three-way valve 5. According to the position of valve 5 (of which only one position is shown in FIG. 8), steam may exit from a first outlet of the valve and water in the liquid state may exit from the second outlet of the valve 5.

In particular, the cold water enters from the pipe 3 and exits from the pipe 2 after which, by means of the three-way valve 5, the steam can be directed towards the steam wand of the device or household appliance, or liquid hot water towards the infusion chamber of the device or household appliance.

Figure 9A:
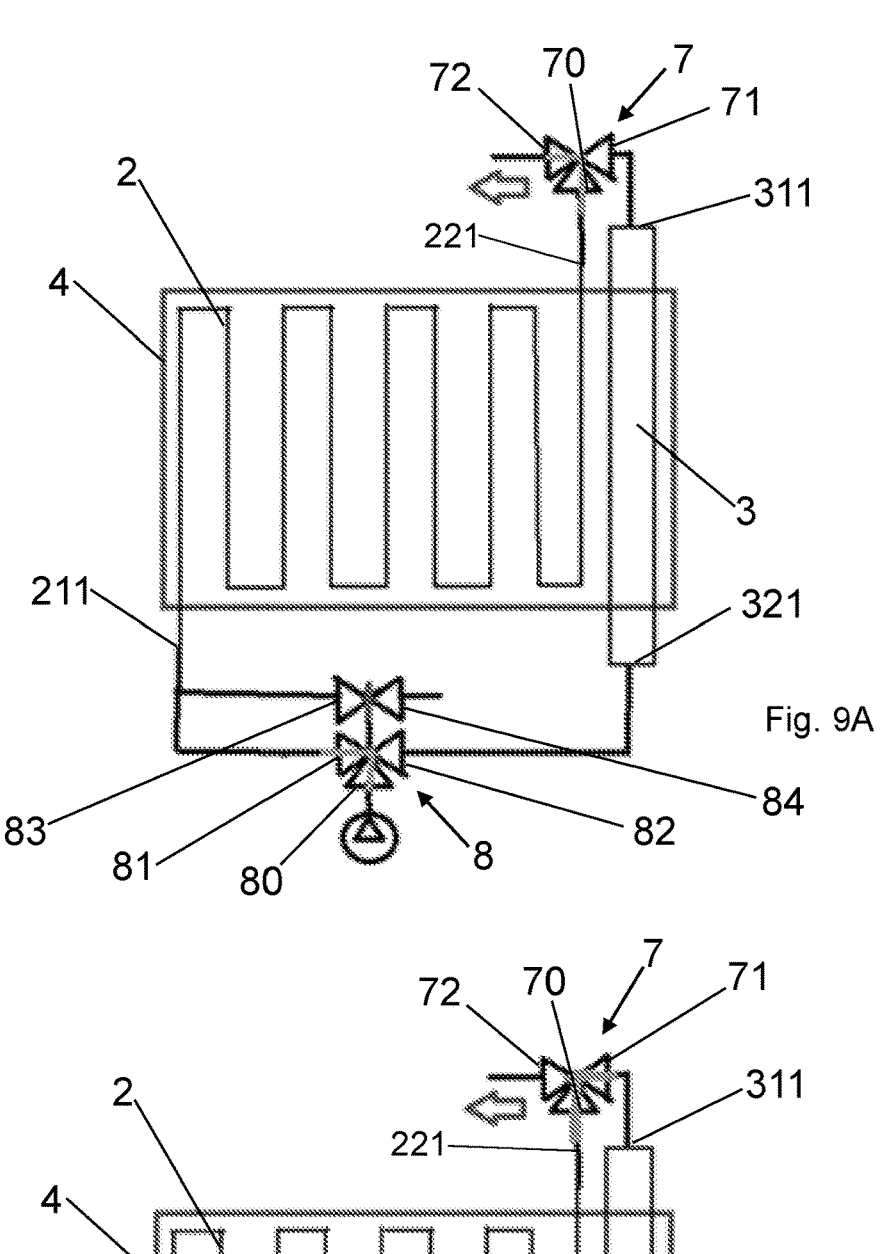
FIG. 9A diagrammatically shows another example of an electric heater according to the invention in a first operating configuration.
Figure 9B:
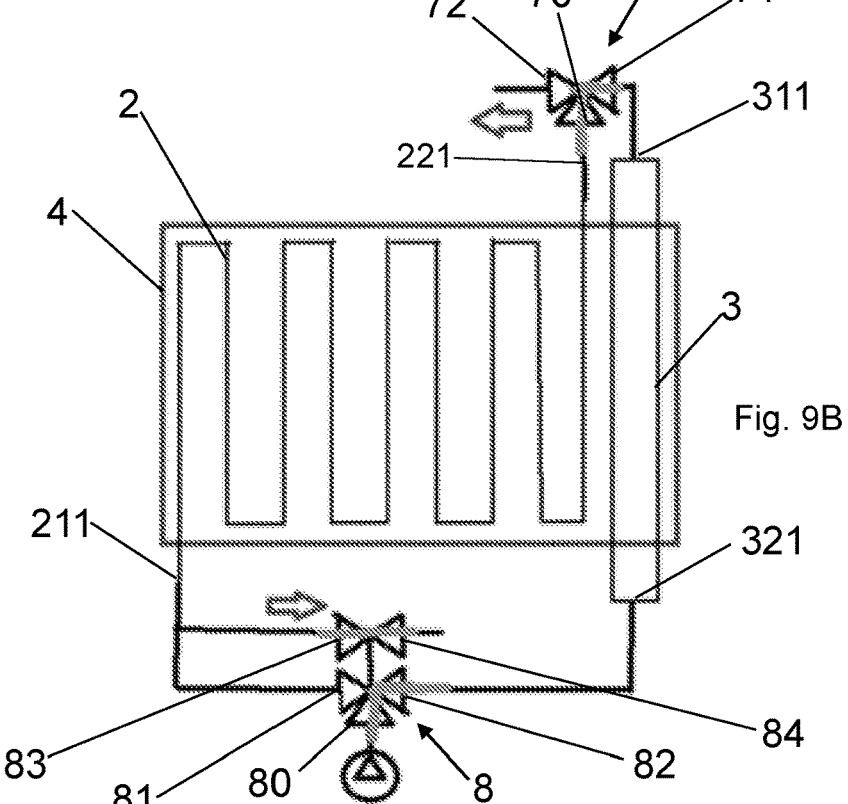
FIG. 9B diagrammatically shows the electric heater in FIG. 9A in a second operating configuration.

FIGS. 9A and 9B show another example of an electric heater according to the invention, in which the pipe 2 and the pipe 3 are connected to each other.

In particular, FIG. 9A and FIG. 9B each show a respective operating configuration.

The pipe 2 and the pipe 3 are connected to each other by means of a valve 7, in particular a three-way valve, preferably arranged along a connecting pipe connecting the pipe 2 and the pipe 3. The pipes 2, 3 may also be connected to each other in other ways, e.g. by two valves, in particular two two-way valves.

The opening 221 of the pipe 2 and the opening 311 of the pipe 3 are connected by means of the valve 7.

The valve 7 has three openings 70, 71, 72.

The opening 70 of the valve 7 is connected to the opening 221 of the pipe 2 and the opening 71 of the valve 7 is connected to the opening 311 of the pipe 3.

Furthermore, the pipe 2 and the pipe 3 are also connected by at least one other valve 8, e.g. by a five-way valve 8. In particular, the opening 211 of the pipe 2 and the opening 321 of the pipe 3 are connected to each other by means of at least one valve 8.

The valve 8 has five openings 80, 81, 82, 83, 84.

The opening 80 is used as an inlet for the water to be heated.

The opening 81 and the opening 83 are connected to the opening 211 of the pipe 2, e.g. by a respective branch or connecting pipe.

The opening 82 is connected to the opening 321 of the pipe 3, e.g. by a connecting pipe.

In a first configuration (FIG. 9A) the electric heater is preferably used to produce hot water, predominantly or substantially in the liquid state.

In particular, the valve 8 is in a configuration in which the water to be heated which enters opening 80 can only exit through the opening 81 and can then enter the pipe 2, in particular only the pipe 2, through the opening 211. In other words, in this configuration the openings 80 and 81 are open and the openings 82, 83, 84 are closed.

Exiting the pipe 2, the fluid enters the opening 70 of the valve 7. In particular, the valve 7 is configured so that the liquid which enters through opening 70 can only exit through the opening 72. In other words, in this configuration, the openings 70 and 72 are open and the opening 71 is closed.

When it exits from the opening 72, the fluid, in particular liquid, can flow into another pipe, for example, or it can reach an infusion chamber or coffee preparation chamber of the device or household appliance.

In a second configuration (FIG. 9B) the electric heater is preferably used to produce predominantly or substantially steam.

In particular, the valve 8 is in a configuration in which the water to be heated which enters opening 80 can initially only exit through the opening 82 and can then enter the pipe 3, in particular only the pipe 3, through the opening 321. In this configuration, the opening 81 is closed.

Exiting the pipe 3, the fluid enters the opening 71 of the valve 7.

In particular, the valve 7 is configured so that the liquid which enters through opening 71 can only exit through the opening 70. In this configuration, the opening 72 is closed.

When it exits from the opening 70, the fluid enters into the pipe 2.

When the fluid (in particular, steam) flows out of the pipe 2, it enters into the opening 83 of the valve 8 and exits from the opening 84. When it exits from the opening 84, the steam can be dispensed, e.g. by means of a wand.

Instead of a five-way valve, for example, a three-way valve and a two-way valve could be used. In particular, in this case, the three-way valve comprises the openings 80, 81 and 82; and the two-way valve comprises the openings 83 and 84. The valves 7, 8 are preferably located outside the metal body 4.

Preferably, the valve 7 and the valve 8 are electrically operated. For example, both the valve 7 and the valve 8 are solenoid valves. For example, the valve 7 and the valve 8 can be equipped with a respective electronic control (substantially similar to the electronic control 59 described above). Alternatively, the valve 7 and/or the valve 8 can be operated manually.

By changing the configurations of the valves 7, 8 as described above, the electric heater can be used for dispensing steam and preparing a hot beverage, e.g. by infusion.

The invention claimed is:

1. An electric heater for a device or household appliance for preparing hot beverages, the electric heater comprising:

a metal body;

at least one electric resistor arranged in the metal body;

a first pipe and a second pipe arranged in the metal body;

wherein the first pipe and the second pipe are mutually distinct and adapted to be connected to each other so that a fluid can pass from the first pipe to the second pipe or vice-versa; and wherein an inner cross-sectional area of the second pipe is from 3 to 22 times greater than an inner cross-sectional area of the first pipe, the second pipe is completely straight, and an elongated helical turbulator being arranged coaxially inside said second pipe, the elongated helical turbulator having a helical-shaped external surface and without orifices formed between an interior channel of the elongated helical turbulator and the helical-shaped external surface thereof for passage of liquid through the elongated helical turbulator, wherein scaling from liquid flowing through the second pipe accumulates on the elongated helical turbulator such that a frequency of descaling maintenance operations is reduced because of an enlarged inner cross-sectional area of the straight second pipe and the elongated helical turbulator extending coaxially therein.

2. The electric heater according to claim 1, wherein first pipe has a length that is greater than the length of second pipe.

3. The electric heater according to claim 1, wherein the first pipe has a length that is at least two times the length of the second pipe.

4. The electric heater according to claim 1, wherein the inner cross-sectional area of the second pipe is from 4 to 12 times greater than the inner cross-sectional area of the first pipe.

5. The electric heater according to claim 1, wherein an inner diameter of the first pipe is from 3 to 6 mm and/or an inner diameter of the second pipe is from 7 to 14 mm.

6. The electric heater according to claim 1, wherein the first pipe has a predetermined length and inner diameter, and a ratio between the predetermined length and the inner diameter of the first pipe is from 130 to 460.

7. The electric heater according to claim 1, wherein said at least one electric resistor, said first pipe and said second pipe are arranged in the metal body so that heat produced by said at least one electric resistor is transmitted by conduction to the first pipe and to the second pipe through the metal body.

8. The electric heater according to claim 1 wherein the first pipe comprises a serpentine-shaped portion.

9. The electric heater according to claim 1, wherein the at least one electric resistor includes a first electric resistor and a second electric resistor arranged in the metal body, wherein the second electric resistor is at least partially parallel to the second pipe.

10. The electric heater according to claim 9, wherein the first electric resistor is adapted to heat the first pipe more than the second pipe; and the second electric resistor is adapted to heat the second pipe more than the first pipe.

11. The electric heater according to claim 9, wherein the first electric resistor is at least partially transverse to the first pipe and/or wherein the first pipe surrounds the first electric resistor; wherein the first pipe comprises one or more coils; and wherein the first electric resistor is at least partially arranged within one or more coils of the first pipe.

12. The electric heater according to claim 1, wherein the first pipe and the second pipe are connected to each other to allow passage of a fluid from the first pipe to the second pipe, and/or vice versa.

13. The electric heater according to claim 12, wherein the first pipe and the second pipe are connected to each other to allow said passage of the fluid through at least one valve.

14. The electric heater according to claim 12, wherein a first opening of the first pipe and a first opening of the second pipe are connected by at least one first valve; and wherein a second opening of the first pipe and a second opening of the second pipe are connected to each other by at least one second valve, which is distinct from the at least one first valve.

15. The electric heater according to claim 13, wherein, as a function of a position of the at least one valve, the at least one valve selectively allows the passage of the fluid from the first pipe to the second pipe for dispensing steam or a passage of fluid from the first pipe into a zone outside the second pipe.

16. The electric heater according to claim 12, wherein the first pipe and the second pipe are connected to each other to allow the passage of the fluid from the second pipe to the first pipe via at least one connecting pipe or vice versa; and/or wherein at least one valve is connected to an opening for letting out the fluid from the first pipe.

17. A device or household appliance for preparing the hot beverages, comprising the electric heater according to claim 1.

\* \* \* \* \*